(12) United States Patent
Burkhart

(10) Patent No.: US 6,666,910 B2
(45) Date of Patent: Dec. 23, 2003

(54) AIR FILTRATION SYSTEM AND METHOD OF USE

(76) Inventor: Jeannine Wadsworth Burkhart, 6408 Westminister Rd., Knoxville, TN (US) 37919

(*) Notice: Subject to any disclaimer, the term of this patent is extended or adjusted under 35 U.S.C. 154(b) by 89 days.

(21) Appl. No.: 10/022,008

(22) Filed: Nov. 29, 2001

(65) Prior Publication Data

US 2003/0097935 A1 May 29, 2003

(51) Int. Cl.[7] .............................. B01D 46/00; F24F 7/013
(52) U.S. Cl. ......................... 95/286; 55/385.2; 55/469; 55/502; 454/195
(58) Field of Search .................... 95/142, 273, 286; 96/133, 147, 223, 226; 55/383, 385.2, 469, 490, 498, 502; 454/187, 195, 207; 588/200

(56) References Cited

U.S. PATENT DOCUMENTS

| 4,433,985 A | * | 2/1984 | McGee | 96/111 |
| 4,686,804 A | * | 8/1987 | Smith | 52/169.6 |
| 5,322,533 A | * | 6/1994 | Todorovic | 55/385.2 |
| 5,399,319 A | * | 3/1995 | Schoenberger et al. | 96/224 |
| 5,407,470 A | * | 4/1995 | Jutzi | 96/121 |
| 6,296,693 B1 | | 10/2001 | McCarthy | 96/117.5 |
| 6,328,775 B1 | * | 12/2001 | Fuchs | 55/385.2 |
| 6,383,241 B1 | * | 5/2002 | Janus et al. | 55/385.2 |
| 6,402,613 B1 | * | 6/2002 | Teagle | 454/195 |
| 6,508,850 B1 | * | 1/2003 | Kotliar | 55/385.2 |

* cited by examiner

Primary Examiner—Frank M. Lawrence
(74) Attorney, Agent, or Firm—Michael E. McKee

(57) ABSTRACT

An air filtration system for filtering air drawn into a substantially enclosed environment, such as a room, having an access opening includes a box having sidewalls, a flexible sheet of substantially air-impermeable material sized to cover the access opening of the environment, at least one filter having a body and a rigid rim encircling the body, and a pump having an inlet conduit through which air is drawn into the pump during pump operation. The components can be assembled to form a filter-supporting unit and, with the aid of the flexible sheet, sealed across the access opening to convert the environment into a shelter into which filtered air is pumped.

14 Claims, 4 Drawing Sheets

AIR FILTRATION SYSTEM AND METHOD OF USE

BACKGROUND OF THE INVENTION

This invention relates generally to the field of air-filtration and, more particularly, is concerned with means and methods for filtering the air entering a substantially enclosed environment, such as room of a home or building, during an event which affects the quality of air surrounding the home or building.

The types of events with which this invention is concerned include nuclear, biological and chemical disasters which can contaminate breathable air and thereby render the air harmful for humans to breathe.

It is known that air which has been contaminated by an event, such as a nuclear, biological or chemical disaster, can be filtered to render the air relatively safe to breathe. One filtration system which has been proposed for filtering contaminated air entering a space is described in U.S. Pat. No. 6,296,693, but filtration systems such as the one described in the referenced patent are complicated in construction and can be relatively expensive to purchase.

It is an object of the present invention to provide a new and improved air filtration system which has relatively few components and which can be constructed relatively quickly to render a substantially enclosed environment relatively safe from contaminated air.

Another object of the present invention is to provide such a system, whose components comprise a kit, for converting an environment, such as a room of a home or building, into a shelter from contaminated air outside of the environment.

Still another object of the present invention is to provide such an air filtration system which is capable of supplying an amount of filtered air to a substantially enclosed environment, which amount is sufficient for survival of the occupants within the environment.

A further object of the present invention is to provide such an air filtration system which is relatively uncomplicated in construction yet efficient in operation.

A still further object of the present invention is to provide a method for constructing the system of the invention.

SUMMARY OF THE INVENTION

This invention resides in an air filtration system for filtering air drawn into a substantially enclosed environment having an access opening and a method of using the system.

The system includes a box having sidewalls which is capable of being closed to provide a substantially enclosed interior, at least one filter having a body and a rigid rim encircling the filter body, and a pump having an inlet conduit through which air is drawn into the pump during pump operation.

The method of the invention includes the steps involved in assembling the components of the system and converting a substantially enclosed environment into a shelter into which filtered air is pumped. In particular, the method includes the steps of cutting openings in a sidewall of the box equal to the number of filters of the system wherein each opening cut in the box sidewall is sized to accept a corresponding filter when the filter is fitted therein, fitting each filter into a corresponding filter-accepting opening of the box sidewall and sealing the at least one filter across the access opening of the environment so that any air flow from the outside of the environment into the box interior must flow through the body of the at least one filter. The box is then closed to thereby enclose its substantially enclosed interior, and the inlet conduit of the pump is connected to a sidewall of the box so that air which is drawn into the pump is pulled from the outside of the environment through the at least one filter and is discharged from the pump into the room in a filtered condition.

DETAILED DESCRIPTION OF THE ILLUSTRATED EMBODIMENT

Figure 1:
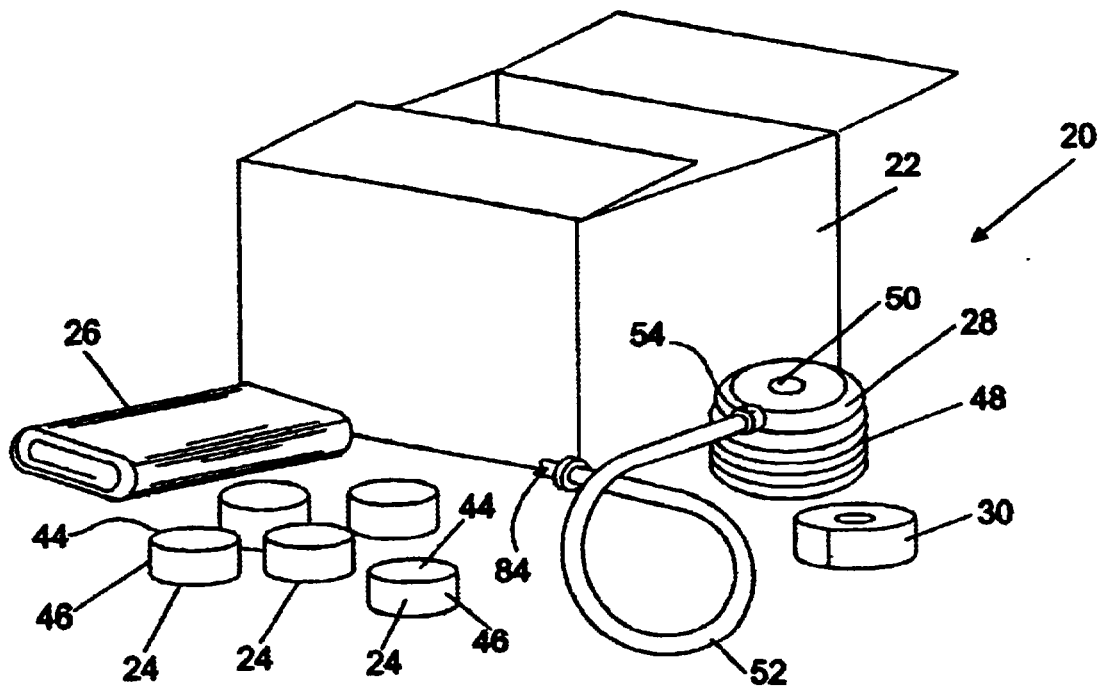
FIG. 1 is a perspective view of components of a kit with which an embodiment of an air filtration system of the present invention can be constructed.

Turning now to the drawings in greater detail, there are illustrated in FIG. 1 the components of an air filtration system, generally indicated 20, which can be used to readily convert a substantially enclosed environment, such as a room of a home or building, into a shelter during an event, such as a nuclear, biological or chemical disaster, which can render the air outside of the home or building harmful for humans to breathe. The example of an environment to be converted to a shelter as discussed in the description which follows is a room of a home or building, but other substantially enclosed environments, such as bubble-type enclosures, can be converted into a shelter with an air filtration system of the present invention. Accordingly, the principles of the present invention can be variously applied.

The components of the system 20 include a box 22, a plurality of (e.g. five) filters 24, a flexible sheet 26 of substantially air-impermeable material (such as plastic), a manually-operable air pump 28 and a supply (i.e. roll) of duct tape 30. As will be described in greater detail herein, the box 22 is used to support the filters 24 within the opening of a doorway to the room being converted to a shelter, and the air pump 28 is connected to the box 22 to draw outside air through the filters 24 and into the room. Meanwhile, the flexible sheet 26 is used in conjunction with the tape 30 to seal the doorway opening (and around the filters 24 mounted within the box 22) and thereby isolate the interior of the room from air outside of the room.

Figure 2:
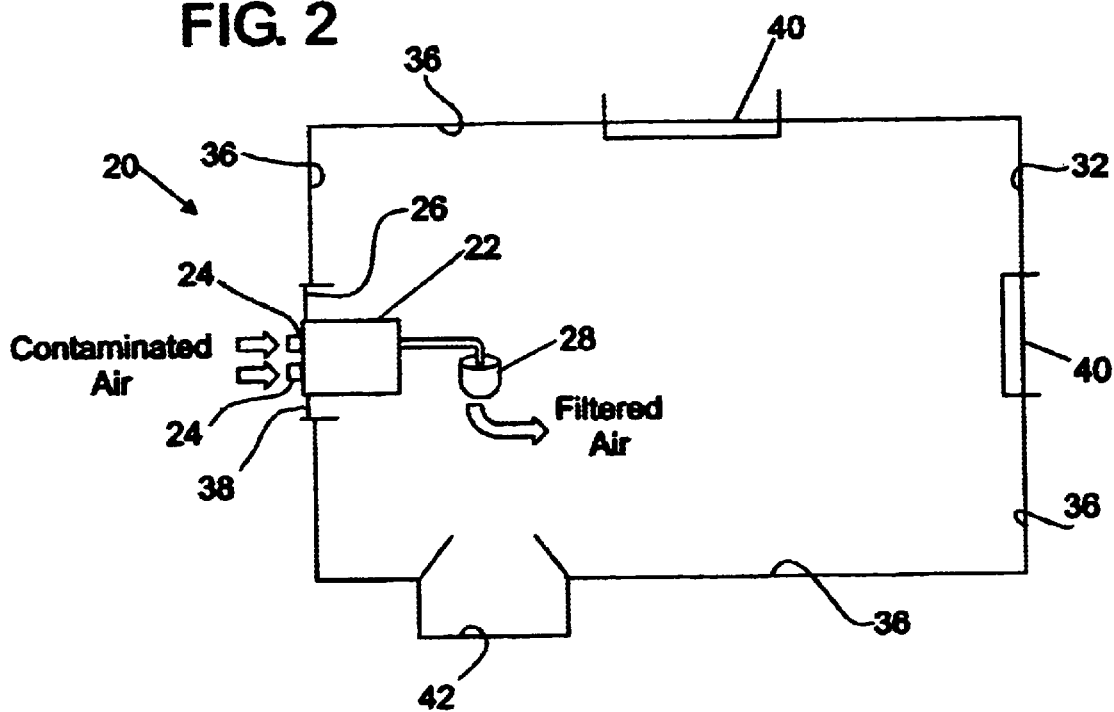
FIG. 2 is a plan view of a room within which an embodiment of an air filtration system can be utilized.

With reference to FIG. 2, there is shown a room 32 of a home or building within which the system 20 is installed for filtering contaminants from air drawn into the room 32 with the pump 28. The depicted room 32 has walls 36 within which a door opening 38 is defined and two windows 40 are provided. In addition, the room 32 has a closet 42 within which supplies, such as survival supplies, can be stored.

As will be apparent herein, a purpose of the system 20 is to seal the doorway (i.e. access) opening 38 and draw air into the inside of the room 20 through the filters 24. Preferably, any holes in the room 32 which may otherwise be present in the room walls 36 and around the windows 40 are appropriately sealed off so that the only air which is permitted to flow into the room 32 is drawn into the room 32 through the system 20. As a consequence of the substantially-sealed condition of the room 32, operation of the filtration system 20 is likely to render the internal pressure of the room 32 a little higher than that of the outside air. Therefore, any air which is permitted to leak or flow through any small hole left uncovered in or around the room walls 36 or windows 40 will flow from inside the room 32 to the outside of the room 32. This way, no contaminated air is permitted to enter the room 32 except by way of the filtration system 20.

With reference again to FIG. 1, the flexible sheet 26 of the system 22 can be a broad sheet of clear polyethylene having a thickness of at least about 6 mil or, in the alternative, a sheet of vinyl plastic of the class commonly used in shower curtains. Therefore, if a sheet of polyethylene is not readily at the disposal of an individual who needs to assemble the system 20 quickly, the flexible sheet 26 can be provided by a shower curtain. In either event, however, the flexible sheet 26 must be sufficient in size to span the width and height of the doorway opening 38.

The box 22 of the depicted system 20 can be constructed of cardboard (although other materials are suitable), has walls (or sidewalls) on each side thereof, and has a top which is capable of being closed and taped shut to provide the box 22 with a substantially enclosed interior. Exemplary dimensions of a box which has been found to be satisfactory for the system 22 are provided here as follows: the width of the box can range from between fifteen inches to twenty-four inches; the length of the box can range from between fifteen inches to twenty-four inches; and the height of the box can range from between fifteen inches to twenty-four inches. As will be explained herein, a plurality of openings are cut in one wall (i.e. a sidewall) of the box 22 to accept the filters 24 mounted therein and a single opening is cut in the opposite wall (i.e. another sidewall) of the box 22 to accept the inlet hose of the pump 28. Therefore, the walls of the box 22 must not be so thick that they are incapable of being readily cut with a pair of scissors or a box knife.

The filters 24 of the depicted system 20 are preferably of the type known in the art as NBC filters (an abbreviation for nuclear, biological and chemical filters) commonly used in gas masks and which include a filter medium, such as charcoal, which is designed to filter toxins from air drawn through the filters 24. If the room 32 (FIG. 2) being converted to a shelter is an inner room of a home or building, it can be expected that toxic substances carried by the air will be substantially diluted by the time that the substances reach the filters 24. Consequently, during use of the system 20, the useful life of the filters 24 can be extended for a relatively long time. Furthermore and inasmuch as NBC filters are designed for use in gas masks, each NBC filter has a body 44 which is somewhat cylindrical in form and has a relatively rigid outer rim 46 which encircles the body 44 and extends between a front face and a rear face of the filter. As will be seen herein, the rigid outer rim 46 facilitates the positioning and sealing of each corresponding filter 24 within a sidewall of the box 22. During use of the system 20, air is drawn through each filter 24 from the front face to the rear face thereof.

As an alternative to NBC filters, the filters 24 can be provided by other types of suitable filters, such as organic vapor respirator filters. These other types of filters may not be capable of filtering as many harmful contaminants from breathable air as do NBC filters, but they are preferably capable of filtering at least some harmful contaminants from the air. In addition, organic vapor respirator filters, like NBC filters, have bodies which are cylindrical in form and are encircled by a relatively rigid outer rim.

With reference still to FIG. 1, the depicted pump 28 is a manually-operable bellows pump having an envelope section 48 and an internally-mounted spring (not shown). For purposes of moving air through the pump, the envelope section 48 is movable between a collapsed condition and an expanded condition while the internally-mounted spring biases the envelope section 48 from its collapsed condition toward its expanded condition. Mounted within one side of the envelope section 48 is a one-way (exit) valve 50 through which air is permitted to exit, but not enter, the envelope section 48 when the envelope section 48 is moved from its collapsed condition toward its extended condition, and mounted within the opposite side of the envelope section 48 is a hose 52 which provides an inlet conduit through which air is pulled into the envelope section 48 when the envelope section 48 is permitted to be moved from its collapsed condition toward its expanded condition. Mounted within the hose 52 is a one-way (inlet) valve 54 which permits air to be pulled into the envelope section 48 by way of the hose 52 but prevents the flow of air out of the envelope section 48 through the hose 52.

To operate the pump 28, the envelope section 48 is manually collapsed (with, for the example, the user's foot or knee) from its expanded condition to its collapsed condition to force air out of the envelope section 48 through the exit valve 50, and then the envelope section 48 is subsequently released to permit the internally-mounted spring to return the envelope section 48 to its expanded condition. As the internally-mounted spring returns the envelope section 48 to its expanded condition, air is pulled, or drawn, into the envelope section 48 through the hose 52 and inlet valve 54.

An example of a manually-operable bellows pump suited for use as the pump 28 is available under the trade designation Sevylor and is capable of moving approximately 1.9 liters of air through the envelope section 48 per pump cycle (i.e. per each successive collapse of the envelope section 48).

Figure 3:
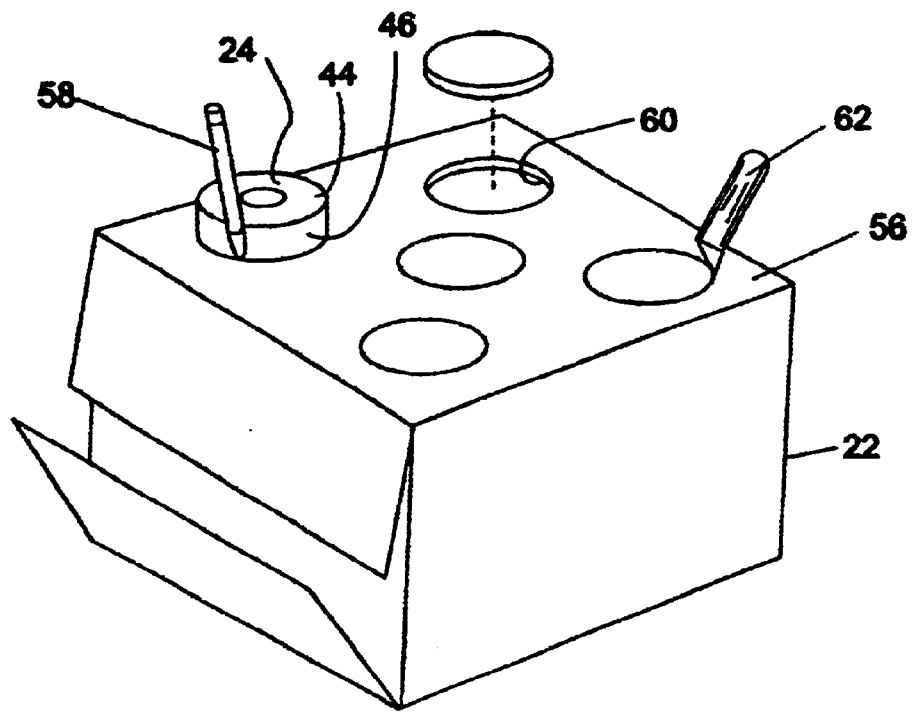
FIGS. 3–5 are perspective views illustrating sequential steps used to construct the air filtration system.

To assemble and install the system 20 and with reference first to FIG. 3, one wall (i.e. sidewall 56) of the box 22 is chosen for supporting the filters 24, and then the box 22 is laid upon a floor with the chosen sidewall 56 facing up. The filters 24 are then positioned upon the chosen sidewall 56 in a somewhat regular pattern. Preferably, the size of the box 22 is large enough so that when positioned against the chosen box sidewall 56, the filters 24 are spaced at least two inches apart and at least one inch from the edge of the chosen sidewall 56.

With the filters 24 positioned against the chosen sidewall 56, the circular outlines of the filters 24 are traced upon the sidewall 56 with a pencil 58. The filters 24 are then lifted from the box sidewall 56, and then the penciled circular outlines are cut from the box sidewall 56 thereby forming openings 60 (only one designated in FIG. 3) within which the filters 24 will be subsequently force-fitted. The openings 60 can be cut within the box sidewall 56 with an Olfa or utility knife 62. To reduce the likelihood of air leakage between the edge of each opening 60 formed in the box sidewall 56 and the rim 46 of a corresponding filter 24 fitted therein, it is preferable that each opening 60 is slightly smaller than, rather than larger than, the filter rim 46. If, however, an opening 60 is formed within the box sidewall 56 which is larger than the diameter of the filter 24 to be fitted therein, a ring-like gasket (not shown) of suitable thickness can be positioned about the rim of the filter 24 so that when the filter 24 is positioned therein, the gasket seals any gap between the rim of the filter 24 and the edge of the opening 60.

Figure 4:
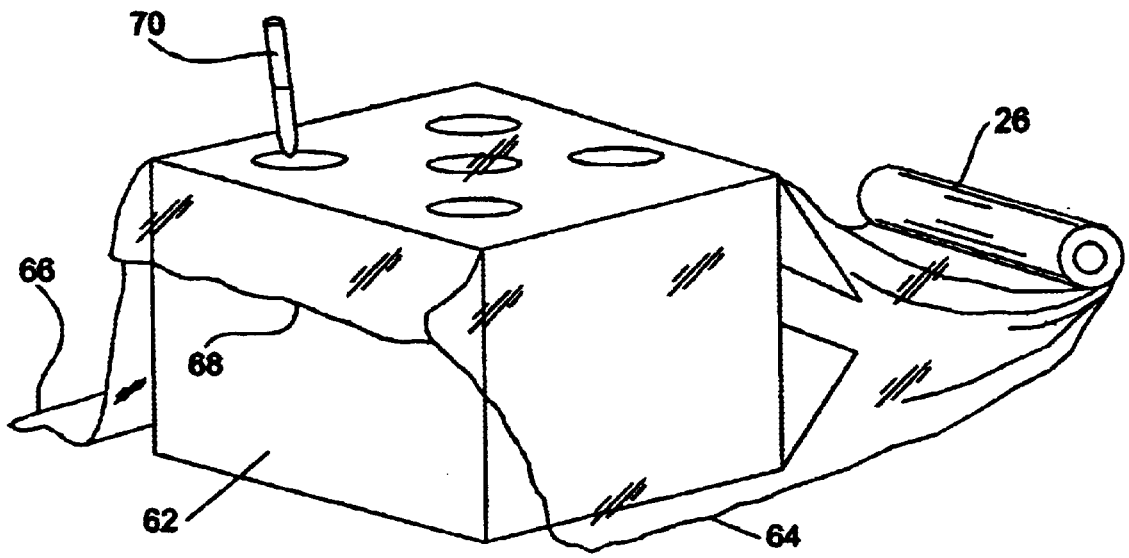

Following the formation of the openings 60 and with reference to FIG. 4, the flexible sheet 26 is placed over the sidewall 56 of the box 22 within which the openings 60 are formed. When accurately positioned beneath the sheet 26 for purposes of this step, the box 22 is positioned about midway between the opposite side edges, indicated 64 and 66, of the sheet 26 so that the side edges 64, 66 of the sheet 26 hang loosely over the opposite side edges of the box sidewall 56, and the bottom edge, indicated 68, of the sheet 22 hangs from the bottom edge of the box sidewall 56 by about four inches.

Figure 5:
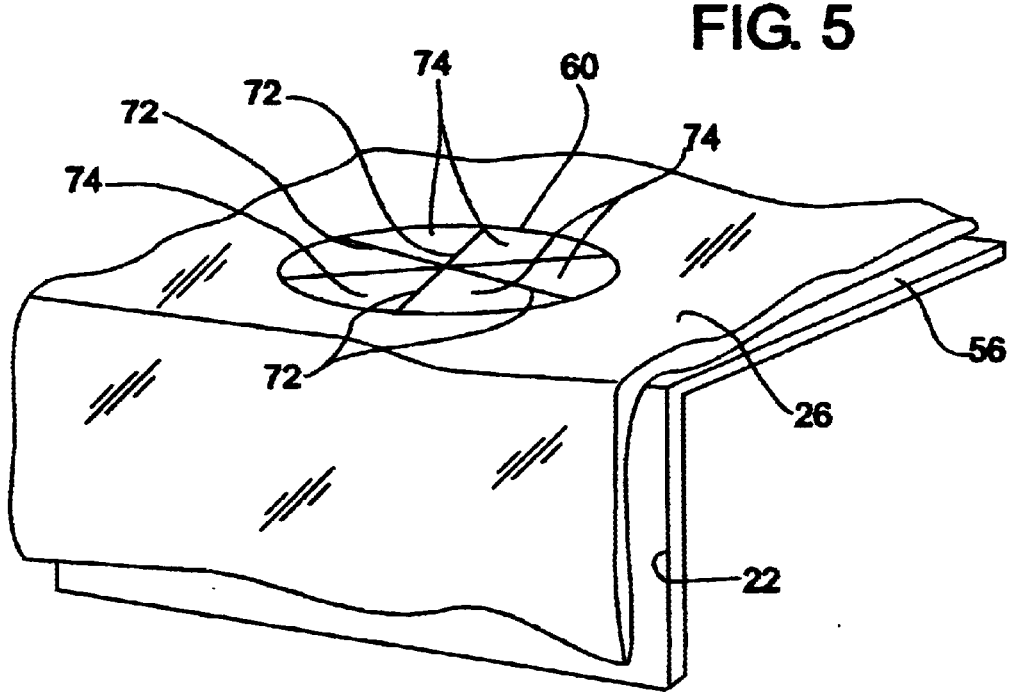
Figure 6:
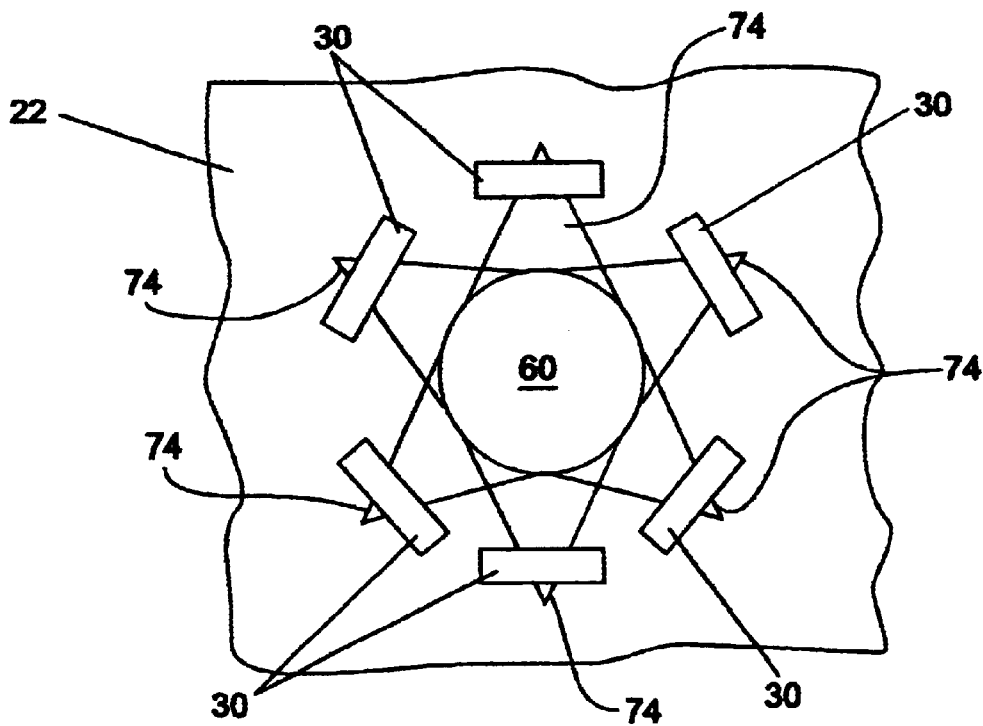
FIG. 6 is a view of a fragment of the interior face, or surface, of a sidewall of the box of FIG. 5 having portions of the flexible sheet folded against and taped thereto.

With the flexible sheet 26 positioned over the box sidewall 56 in the manner depicted in FIG. 4, the outlines of the openings 60 are traced upon the flexible sheet 26 with a marking pen 70. Then, while holding the flexible sheet 26 in a stationary position over the box sidewall 56, a utility knife is used to cut slits 72 (FIG. 5) in the sheet 26 through the center of the opening 60 so that the slits 72 sever the outline of the opening 60 into wedge-shaped sections 74 having a point, or apex, which generally corresponds with the center of the outline of the opening 60. Each of the wedge-shaped sections 74 is then pushed through the opening 60 and folded back upon and secured, as with the tape 30, to the interior face, or surface, of the box sidewall 56 adjacent its corresponding opening 60, as illustrated in FIG. 6, to line its corresponding opening 60 with the material of the flexible sheet 26.

Figure 7:
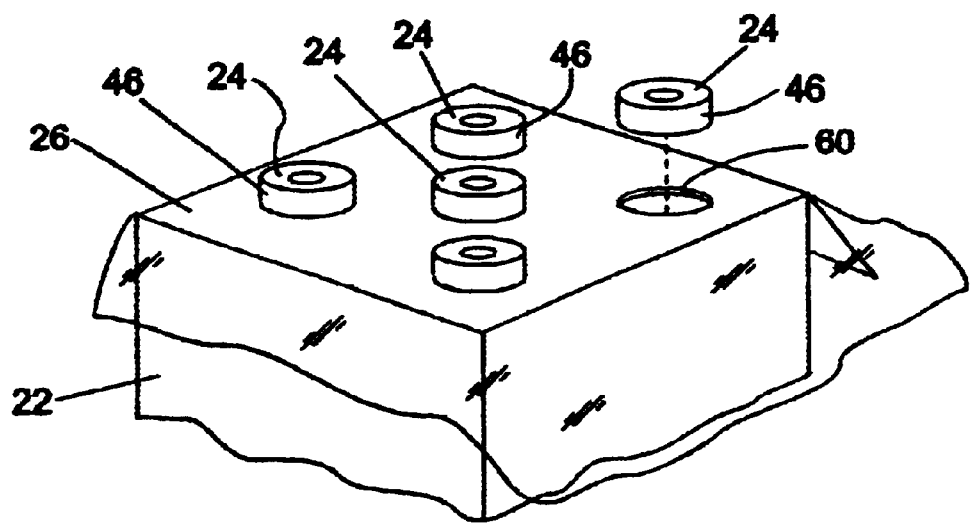
FIG. 7 is a perspective view of the filters being installed within openings formed in the FIG. 5 box.

Each filter 24 is subsequently press-fitted within a corresponding sheet-lined opening 60 as illustrated in FIG. 7 so that the edge of the opening 60 encircles the rim 46 of the filter 24 and is then taped in place with small pieces of suitable tape, such as the duct tape 30 (FIG. 1), which overlap so as to adhere to the both the surfaces of the filter rim 46 and the portions of the flexible sheet 26 adjacent the filter 24. For purposes of sealing the opening 60, it is preferable that the entire circumference of the filter rim 46 be encircled (and thus covered) with the tape 30. It also follows that the force-fitting of the filter 24 through its corresponding opening 60 so that the filter sheet 26 is thereby sandwiched between the surface of the filter rim 46 and the edge of the corresponding opening 60 reduces any likelihood that air will enter the opening 60 by any route other than through the filter 24.

Figure 8:
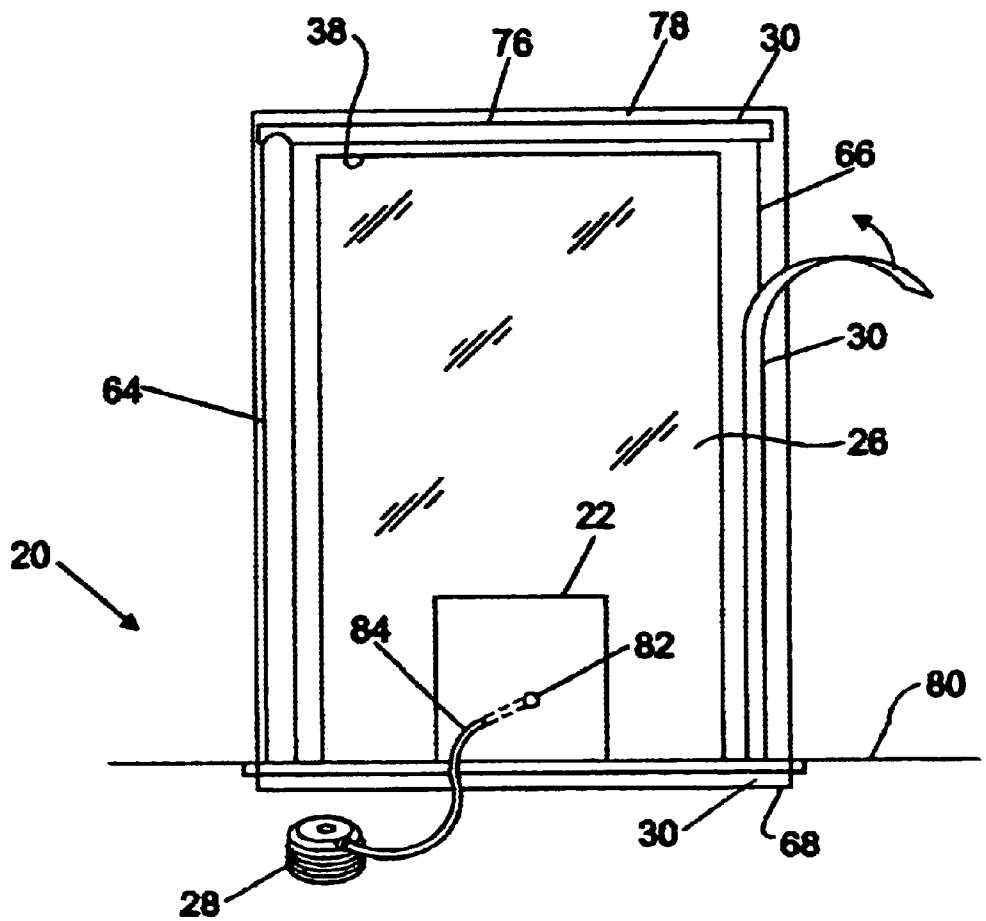
FIG. 8 is a perspective view illustrating the positioning of the filtering-supporting box of FIG. 7 within the doorway opening of the FIG. 2 room and the securement of the flexible sheet to the frame of the door opening.

The flexible sheet 26 (with the box 22 and filters 24 secured thereto) is then placed across the door opening 38 as illustrated in FIG. 8 for purposes of sealing the door opening 38 with the sheet 26. To this end, the sheet 26 is placed across the door opening 38 so that the box 22 rests upon the floor, indicated 80, generally midway between the sides of the door opening 38 (as illustrated in FIG. 8) and so that the filters 24 are directed out of the room 32 (as illustrated in FIG. 2) and so that the side edges 64, 66 and top edge, indicated 76, of the sheet 26 overlap the surface of the frame, indicated 78, surrounding the door opening 38. In order that the sheet 26 be able to be positioned flush against the door frame 78, any door associated with the opening 38 may have to be removed from the frame 78 by, for example, removing the pins from the door hinges. The side and top edges 64, 66, 76 of the sheet 26 are then taped, such as with the duct tape 30, to the door frame 78 to prevent any leakage of air between the sheet 26 and the door frame 78. Although it is possible to tape the side and top edges 64, 66, 76 of the sheet 26 to the surface of a wall 36 (i.e. wallboard) of the room 32 adjacent the door opening 38, the surface of the door frame 78 is likely to provide a smoother surface for purposes of sealing the room 32. The bottom edge 68 of the sheet 28 is then spread along the floor 80 and then taped thereto with duct tape 30. If necessary, any threshold strip or carpeting which commonly extends across the bottom of the door opening 38 may have to be removed before taping the bottom edge 68 to the floor 80 to ensure an airtight seal between the flexible sheet 26 and the floor 80.

With reference again to FIG. 8, a small hole 82 is cut in the sidewall of the box 22 opposite the filter-supporting sidewall 56 for tightly accepting the free end, indicated 84, of the hose 52 of the pump 28, and then the free hose end 84 is inserted into the opening 82. The hose end 84 is then taped into place within the opening 82 with duct tape 30 so that any space between the edges of the opening 32 and the outer surface of the hose end 84 is completely sealed. If the hose end 84 to be inserted into the hole 82 is rough or has any plastic tabs projecting from the side thereof, it is preferable that the hose end 84 be smoothed and any tabs cut therefrom such as, for example, with a knife.

As a next step, any open top of the box 22 must be closed and then sealed, for example; with duct tape 30, to substantially enclose the interior of the box 22. Along the same lines, any cracks or openings in the sides or corners of the box 22 through which air could leak should also be covered (as with tape 30) to thereby seal the cracks or openings. The system 20 is then ready for use.

To use the system 20 and with reference again to FIG. 2, the pump 28 is manually actuated, or operated, to draw air into the room 32 through the interior of the box 22 and the pump 28. It follows that as the air is drawn from the box interior through the pump 28, air is pulled into the box interior through the filters 24 so that air which enters the room 32 through the box interior and the pump 28 is filtered by the filters 24. It has been found that as the pump 28 is cycled during operation, the box 22 heaves in and out in a manner resembling a lung.

Due to the relatively low flow rate of air drawn into the room through the pump 28, the filtered air may not be sufficient to keep the occupants of the room very comfortable, but it will be sufficient to sustain life. Moreover and as far as the number of filters 24 used in the system 20 is concerned, it is preferable that there be one filter 24 mounted in the box 22 for every one occupant of the room 32. Therefore, the depicted system 20—with its five filters 24—is capable of filtering the air for a room having five occupants. If the room 32 is to contain more than five occupants, more than five filters 24 would need to be mounted within the box 22.

To determine how often the pump 28 will be needed to be operated in order that satisfactory air requirements of the occupants can be met, the following chart and formula can be used:

|  | Breathing volumes | Required fresh air |
| --- | --- | --- |
| Adult male or young man: | 6.0 liters/minute | 12.0 liters/minute |
| Adult female: | 4.5 liters/minute | 9.0 liters/minute |
| Child: | 3.0 liters/minute | 6.0 liters/minute |

Therefore, for a family comprised of a father, mother, teenage son and two young children, a total of 45 liters/minute (the sum of 12, 9, 12, 6 and 6) would be needed. As mentioned earlier, the Sevylor foot pump described above draws between about 1.9 and 2.4 liters of air with each compression cycle. Consequently, in this example, the Sevylor foot pump would have to be operated through twenty-four cycles of operation per minute. If an alternative type of foot pump providing an alternative rate of flow is used, then appropriate calculations would have to be made to determine the number of cycles of operation needed for that pump.

Due to the necessary operation of the pump 28 while the room 32 is occupied, boredom may be a greater problem for the person who operates the pump 32 than fatigue. By placing the knee upon the envelope section 48 of the pump 22 and then rocking back and forth sideways, the user can shift his center of gravity to permit his body weight compress the envelope section 48 to its collapsed condition and subsequently permit the envelope section 48 (by way of the internal spring of the pump 28) to return the envelope section 48 to its expanded condition.

The foregoing calculations regarding filtered air requirements are based upon averages and may not reflect the actual filtered air flow requirements. For example, muscular people may demand more oxygen and obese people may demand less oxygen. Similarly, smokers and people with respiratory diseases may also require a greater volume of filtered air than what is suggested in the examples above. In addition, the foregoing calculations assume that the occupants of the room are at rest. Thus, people involved in rigorous activity may require a greater rate of filtered air. Therefore, the figures provided above can be used as a general guide, but characteristics and expected activity level of the room occupants should also be taken into account. One's body will let him know if he is not getting enough air, and if that is the case, the pump 28 should be cycled at a greater frequency.

Medical literature makes clear that the breathing of progressively increased concentrations of carbon dioxide ($CO_2$) can be hazardous to one's health. It is therefore necessary to assure that when used, the filtration system described herein can maintain the $CO_2$ levels of the enclosed environment within tolerable limits for at least twenty-four hours. What is a tolerable level of $CO_2$ will vary between individuals (depending, for example, upon the age and health of each individual), but based upon data obtained from medical diagnostic $CO_2$ stress tests, it is believed that relatively healthy individuals can tolerate a $CO_2$ level of 2% indefinitely.

A simplified equation which can be used to determine the ambient $CO_2$ concentration, X, in a partially closed environment which has been occupied by occupants is provided below as follows:

$$X = 0.0004 + 0.036 B/F$$

wherein B is the breathing volume of the occupants of the environment, wherein F is the volume flow of fresh air into and out of the environment, and wherein the initial ambient $CO_2$ concentration of atmospheric air is assumed to be 0.04% and the concentration of $CO_2$ in the respired air of the occupants is assumed to be 3.6%. Other relevant factors, such as volume of the sealed environment and the amount of time that the system has been operating, have been taken into account in the foregoing simplified equation.

The foregoing simplified equation indicates that as long as the flow of filtered air into the sealed environment is at least twice the volume of the occupants in the environment, the ambient CO concentration of the environment is about one-half of the value of (0.0004+0.036), or approximately 1.8%. This 1.8% concentration is comfortably less than the 2% concentration which can be tolerated by healthy individuals.

It will be understood that numerous modifications and substitutions can be had to the aforedescribed invention without departing from the spirit of the invention. For example, although the aforedescribed embodiment has been shown and described as employing only one manually-operated foot pump 28 and five filters 24, alterative numbers of pumps and filters can be employed. Furthermore, if more than one pump 28 were attached to the box 22, the pumping workload for one person can be reduced. More specifically, if two foot pumps 28 are attached to the box 22, two people can share the workload involved in providing a sufficient amount of filtered air to the room 32. Therefore, in the foregoing example involving two identical Sevylor pumps, the cycles per minute required for each pump is cut in half from the twenty-four cycles per minute derived earlier. Further still, the pump used in the system can be battery-operated, rather than manually-operable.

Accordingly, the aforementioned embodiment is intended for the purpose of illustration and not as limitation.

What is claimed is:

1. An air filtration system for filtering air drawn into a substantially enclosed environment having an access opening, the system comprising:
   a box having sidewalls which is capable of being closed to provide a substantially enclosed interior;
   at least one filter having a body and a relatively rigid rim which encircles the filter body;
   a flexible sheet of substantially air-impermeable material capable of being sealed across the access opening of the substantially enclosed environment; and
   a pump having an inlet conduit through which air is drawn into the pump during pump operation so that by
      a) cutting openings in a sidewall of the box equal to the number of filters of the system wherein each opening cut in the box sidewall is sized to accept a corresponding filter when the filter is fitted therein;
      b) positioning the flexible sheet of substantially air-impermeable material across the sidewall of the box within which the filter-accepting openings have been cut;
      c) forming an opening in each region of the flexible sheet of substantially air-impermeable material which is positioned in registry with a filter-accepting opening of the box sidewall;
      d) fitting each filter into a corresponding filter-accepting opening of the box sidewall and the corresponding opening formed in the flexible sheet positioned in registry with the filter-accepting opening so that material of the sheet is sandwiched between the rim of the filter and the edge of the corresponding filter-accepting opening to thereby seal the filter within the corresponding filter-accepting opening and sealing the at least one filter across the access opening of the environment by means of the flexible sheet of substantially air-impermeable material so that any air flow from the outside of the environment into the box interior must flow through the body of the at least one filter;
      e) closing the box to thereby enclose its substantially enclosed interior; and
      f) connecting the inlet conduit of the pump to a sidewall of the box so that air which is drawn into the pump is pulled from the outside of the environment through the at least one filter and is discharged from the pump into the room in a filtered condition.

2. The air filtration system as defined in claim 1 wherein the sheet of material is a plastic sheet.

3. The air filtration system as defined in claim 1 wherein the pump is a manually-operable pump.

4. An air filtration system for filtering air drawn into a substantially enclosed environment having an access opening, the system comprising:
- a box having sidewalls and which is capable of being closed to provide a substantially enclosed interior;
- a flexible sheet of substantially air-impermeable material sized to cover the access opening of the environment;
- at least one filter having a body and a relatively rigid rim which encircles the body; and
- a pump having an inlet conduit through which air is drawn into the pump during pump operation so that by
  a) cutting openings in a sidewall of the box equal to the number of filters of the system wherein each opening cut in the box sidewall is sized to accept a corresponding filter when the filter is fitted therein;
  b) placing the sheet of material in overlying relationship with the sidewall of the box within which the filter-accepting openings have been cut;
  c) forming an opening in each region of the sheet of material which is positioned in registry with a filter-accepting opening of the box sidewall;
  d) fitting each filter into a corresponding filter-accepting opening of the box sidewall and the corresponding opening formed in the sheet of material positioned in registry with the filter-accepting opening so that no air flow is permitted to pass between the relatively rigid rim of the filter and the edge of the filter-accepting opening or between the sheet of material and the edge of the filter-accepting opening and to thereby secure the box to the sheet of material;
  e) closing the box to thereby enclose its substantially enclosed interior;
  f) spreading the sheet of material, while the sheet remains secured to the box, across so as to cover the access opening and so that each filter supported by the box is in flow communication with the air outside of the access opening, and sealing the sheet across the access opening; and
  g) connecting the inlet conduit of the pump to a sidewall of the box so that air which is drawn into the pump is pulled from the outside of the access opening through the at least one filter and is discharged from the pump into the room in a filtered condition.

5. The air filtration system as defined in claim 4 wherein the step of forming an opening in each region of the sheet of material includes the step of cutting a series of slits in each region of the sheet to form wedge-shaped sections whose base corresponds with the perimeter of the corresponding filter-accepting opening, and the step of cutting is followed by the step of pushing the wedge-shaped sections through the corresponding filter-accepting openings and securing the wedge-shaped sections to the interior face of the box sidewall so that the material of the sheet of material lines the edges of each filter-accepting opening of the box sidewall so that by subsequently fitting each filter into a corresponding filter-accepting opening sandwiches the material of the sheet between the edge of the corresponding filter-accepting opening and the filter.

6. The air filtration system as defined in claim 4 wherein the sheet of material is a plastic sheet.

7. The air filtration system as defined in claim 4 wherein the pump is a manually-operable pump.

8. A method of converting a substantially enclosed environment into a shelter into which filtered air is pumped and wherein the environment has an access opening, the method comprising the steps of:
- providing a box which is capable of being closed to provide the box with a substantially enclosed interior, and wherein the box has sidewalls;
- providing at least one filter having a body;
- cutting openings in a sidewall of the box equal to the number of provided filters, and wherein each opening is sized to accept a corresponding filter when the filter is fitted therein;
- fitting each filter into a corresponding filter-accepting opening of the box sidewall and sealing the at least one filter across the access opening of the environment so that any air flow from the outside of the environment into the box interior must flow through the body of the at least one filter;
- closing the box to thereby enclose its substantially enclosed interior;
- providing a pump having an inlet conduit through which air is drawn into the pump during pump operation; and
- connecting the inlet conduit of the pump to a sidewall of the box so that air which is drawn into the pump is pulled from the outside of the access opening through the at least one filter and is discharged from the pump into the environment in a filtered condition.

9. The method as defined in claim 8 wherein the substantially enclosed environment to be converted into a shelter is a room of a home or building.

10. The method as defined in claim 8 wherein the pump which is provided during the step of providing an air pump is a manually-operable pump.

11. The method as defined in claim 8 wherein the step of connecting the inlet conduit of the pump to a sidewall of the box disposes the pump within the environment to be converted to a shelter.

12. A method of converting a substantially enclosed environment into a shelter into which filtered air is pumped and wherein the environment has an access opening, the method comprising the steps of:
- providing a box which is capable of being closed to provide the box with a substantially enclosed interior, and wherein the box has sidewalls;
- providing a flexible sheet of substantially air-impermeable material sized to cover the access opening;
- providing at least one filter having a body;
- cutting openings in the a sidewall of the box equal to the number of provided filters, and wherein each opening is sized to accept a corresponding filter when the filter is fitted therein;
- placing the sheet of material in overlying relationship with the sidewall of the box within which the filter-accepting openings have been cut;
- forming an opening in each region of the sheet which is positioned in registry with a filter-accepting opening of the box sidewall;
- fitting each filter into a corresponding filter-accepting opening of the box sidewall and sealing the filter therein so that the sheet of material and the filter are secured in a stationary condition with respect to the box;
- closing the box to thereby enclose its substantially enclosed interior;
- spreading the sheet of material, while the sheet remains secured to the box, across so as to cover the access opening of the environment so that each filter supported by the box is in flow communication with the air outside of the access opening, and sealing the sheet across the access opening;

providing an air pump having an inlet conduit through which air is drawn into the pump during pump operation; and connecting the inlet conduit of the pump to a sidewall of the box so that air which is drawn into the pump is pulled from the outside of the access opening through the at least one filter and is discharged from the pump into the environment in a filtered condition.

13. The method as defined in claim 12 wherein the step of forming an opening in the each region of the sheet which is positioned in registry with a filter-accepting opening includes the step of cutting a series of slits in each region of the sheet to form wedge-shaped sections whose base corresponds with the perimeter of the corresponding filter-accepting opening, and the step of cutting is followed by the step of pushing the wedge-shaped sections through the corresponding filter-accepting openings and securing the wedge-shaped sections to the interior face of the box sidewall so that the material of the sheet lines the edges of each filter-accepting opening of the box sidewall and so that by subsequently fitting each filter into a corresponding filter-accepting opening, the material of the sheet is sandwiched between the body of the filter and the edge of a corresponding filter-accepting opening.

14. The method as defined in claim 12 wherein the flexible sheet which is provided during the step of providing a flexible sheet is a plastic sheet.

* * * * *